Mar. 20, 1923
H. R. REYNOLDS
BALL BEARING END CLOSURE
Filed Jan. 24, 1922
1,449,190
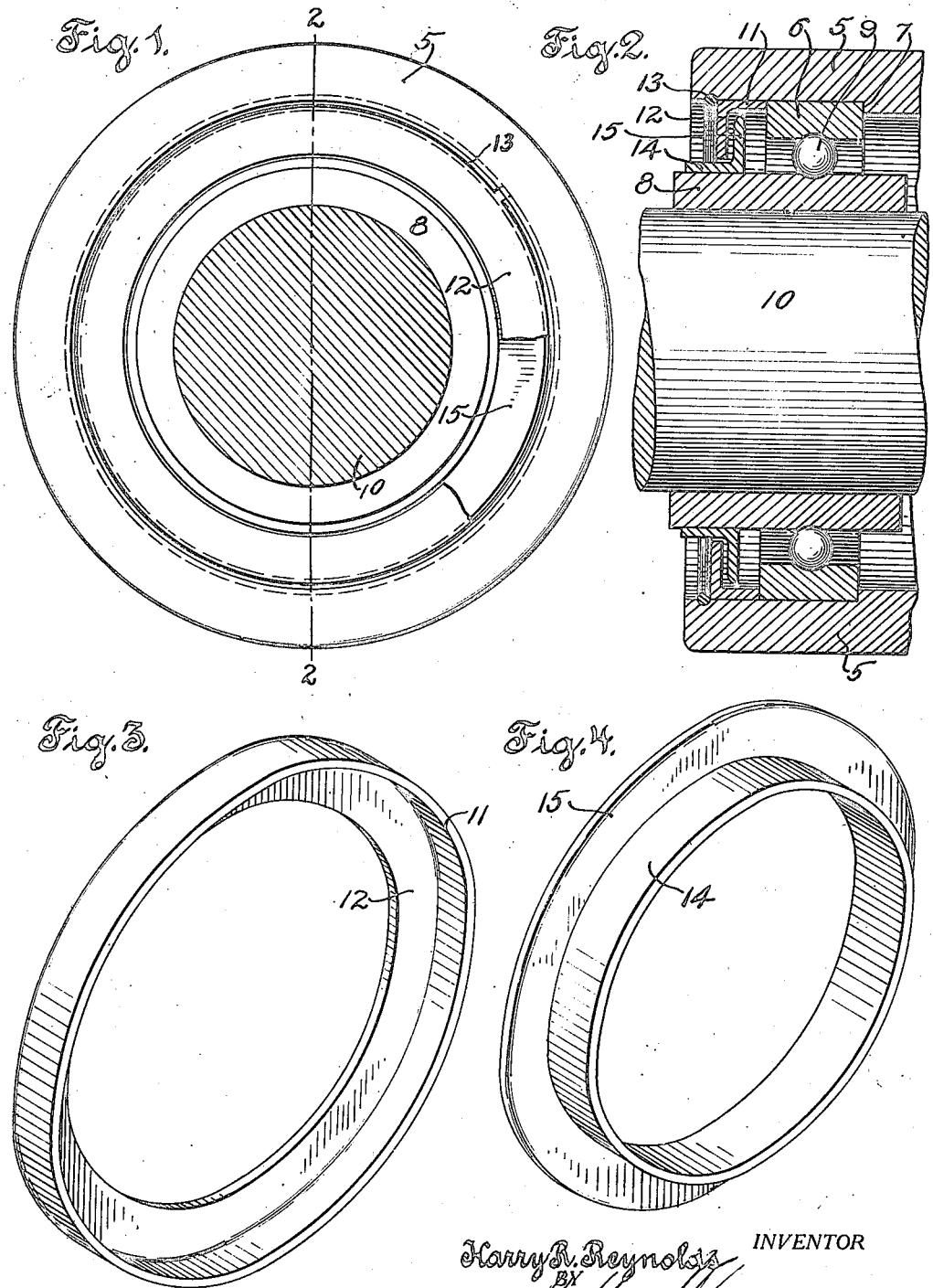
INVENTOR
Harry R. Reynolds
BY
ATTORNEY Patented Mar. 20, 1923.

1,449,190

UNITED STATES PATENT OFFICE.

HARRY R. REYNOLDS, OF NEW BRITAIN, CONNECTICUT, ASSIGNOR TO THE FAFNIR BEARING COMPANY, OF NEW BRITAIN, CONNECTICUT, A CORPORATION OF CONNECTICUT.

BALL-BEARING END CLOSURE.

Application filed January 24, 1922. Serial No. 531,364.

*To all whom it may concern:*

Be it known that I, HARRY R. REYNOLDS, a citizen of the United States of America, residing at New Britain, Hartford County, Connecticut, have invented a new and useful Ball-Bearing End Closure, of which the following is a specification.

My invention relates to a ball bearing and particularly to an end closure and dust ring therefor.

The invention is adapted for use in many connections, but is particularly useful in and will be described in connection with a hanger box, such, for instance, as is disclosed in my Reissue Patent No. 15,187.

It is the general object of the invention to provide a cheap and serviceable end closure and dust ring for a bearing.

It is a further object to provide a dust ring or end closure for bearings which will render the use of felt or similar washers unnecessary.

It is another object to provide an end closure for a bearing which will reduce to a minimum the leakage of lubricant from the bearing.

It is a more specific object to provide an end closure for hanger boxes in which one part of the end closure serves to hold one of the bearing rings in place in the housing.

Other minor objects will be apparent as the specification proceeds.

In the preferred form of my invention I employ suitable inner and outer rings having anti-friction members therebetween and forming the usual type of anti-friction bearing. One of the rings has associated therewith a member having a radially projecting flange extending in general toward the other member. The other ring has associated with it a somewhat similar member having a flange projecting radially in general toward the other ring and overlapping the first mentioned flange. These overlapping flanges constitute in effect an end closure and dust ring for the bearing.

These flange members are preferably formed of sheet metal, one of which may be stamped out in cup form, so as to leave a circumferential sleeve and an annular flange projecting radially therefrom. The other member may be formed as a sleeve with a peripheral flange extending outwardly therefrom. The sleeve portions of these members are mounted on or adjacent to the two rings in any desired manner.

In the drawings I have shown, for illustrative purposes only, one preferred form of my invention.

In said drawings—

Figure 1 is an end view of a hanger box embodying features of my invention, parts being broken away and the shaft shown in section;

Fig. 2 is a fragmentary sectional view, taken substantially in the plane of the line 2—2 of Fig. 1;

Fig. 3 is a perspective view of one of the closure members forming part of my invention; and Fig. 4 is a similar view of another of the closure members.

In said drawings, 5 indicates a portion of a hanger box or other housing. An outer bearing ring 6 is mounted in the housing, and in the form shown the outer end of the housing is counterbored, so as to leave a shoulder 7 against which the outer ring 6 abuts. Mounted concentrically within the outer ring is the inner ring 8, and between the two rings are mounted anti-friction members, such as balls 9. The shaft 10, as usual, passes into or through the inner ring 8.

It is understood that usually a bearing such as just described is provided at each end of the hanger box, but it is possible to construct hanger boxes with a single bearing, and since the invention is not limited to hanger boxes nor to the number of bearing units provided, only a single bearing unit and a fragment of a housing has been disclosed.

My improved means for forming an end closure or dust cap for the hanger box or bearing may be as follows:

A cup-shaped member, which may include the sleeve portion 11 and the radially inwardly projecting flange 12, is mounted in the housing. In the form shown the sleeve portion 11 fits snugly within the counterbored portion of the housing and abuts against the outer ring 6. Means, such as the split retaining ring 13, serves to hold the cup-shaped member in the housing, and it will be seen that in the form shown the outer ring will be securely held in the housing between the shoulder 7 and the inner edge of the sleeve portion 11 of the cup-shaped member. Mounted upon or associated with the inner ring is a sleeve member 14, provided with a radially outwardly projecting flange 15. In the form disclosed the sleeve portion 14 fits over the inner ring and is held thereto frictionally or otherwise.

In the form shown the rotatable member is the inner ring, and I therefore position the flange 15 of the inner ring between the inwardly projecting flange 12 and the bearing elements 9. The purpose of such an arrangement is that when lubricant works outwardly and the shaft and inner flange 15 are rotating, the lubricant will be thrown outwardly and will be retained by the flange 12 of the cup-shaped member. The two flanges 12 and 15 preferably do not come in direct contact with each other but are positioned in close proximity to each other, so that an end closure and an effective dust cap are formed.

It will be seen that no felt washers are required, and if the flanges do not contact with each other there will be no loss due to friction, such as is common with the ordinary types of closures or dust rings.

The parts of the end closure may be easily and cheaply formed of sheet metal, which is, of course, readily stamped. The entire end closure will be effective for the purpose for which it is designed, dust and dirt will be excluded, and the leaking of oil or lubricant from the bearing will be reduced to a minimum.

It will likewise be obvious that the flanges need not necessarily be formed on sleeve members, but the flanges may be simply in the form of annular rings or washers mounted on or adjacent their respective rings.

While I have disclosed a specific form of my invention in great detail and as applied to a hanger box construction, I do not wish to be limited to that specific application of an end closure, nor do I wish to be limited to the exact form of closure shown, since modifications and changes may be made without departure from the appended claims.

I claim:

1. In a ball bearing, inner and outer bearing rings having anti-friction elements therebetween, a housing for said outer ring, a sleeve mounted in said housing and having a flange projecting inwardly toward the inner ring, said sleeve abutting the outer ring, means for holding said sleeve in the housing for positioning the outer ring therein, and a sleeve on the inner ring having a flange projecting outwardly and overlapping said first mentioned flange whereby a closure for the housing and bearing is formed.

2. In a hanger box, a housing, an outer bearing ring mounted in said housing, a sleeve mounted in said housing and abutting said outer ring, means for retaining said sleeve and outer ring in place in the housing, said sleeve having a flange projecting radially inwardly, an inner ring, anti-friction members between said rings, and a sleeve on said inner ring and having a flange projecting radially outwardly and overlapping said first mentioned flange whereby an end closure for the housing and bearing is formed.

3. In a bearing, a housing having a counterbored portion, an outer bearing ring mounted in said counterbored portion, a sleeve member in said counterbored portion and abutting said outer ring, retaining means for holding said sleeve and said outer ring in place in said counterbored portion, an annular flange on said sleeve and projecting inwardly, an inner bearing ring, anti-friction means between said bearing rings, a sleeve on said inner bearing ring, and an annular flange on said last mentioned sleeve and projecting outwardly between said first mentioned flange and the anti-friction members.

HARRY R. REYNOLDS.